United States Patent
Bugajski et al.

(10) Patent No.: US 9,722,850 B2
(45) Date of Patent: Aug. 1, 2017

(54) METHOD AND SYSTEM FOR TRANSFORMING VIDEO STREAMS USING A MULTI-CHANNEL FLOW-BONDED TRAFFIC STREAM

(75) Inventors: Mark Bugajski, Norcross, GA (US); Carol Ansley, Alpharetta, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 965 days.

(21) Appl. No.: 11/337,752

(22) Filed: Jan. 23, 2006

(65) Prior Publication Data
US 2006/0182139 A1    Aug. 17, 2006

Related U.S. Application Data

(63) Continuation-in-part of application No. 11/200,313, filed on Aug. 9, 2005.
(Continued)

(51) Int. Cl.
*H04L 12/28* (2006.01)
*H04L 29/06* (2006.01)
(Continued)

(52) U.S. Cl.
CPC .... *H04L 29/06027* (2013.01); *H04L 65/4084* (2013.01); *H04L 65/607* (2013.01);
(Continued)

(58) Field of Classification Search
CPC .............. H04L 65/4084; H04L 65/607; H04L 12/2801; H04L 29/06; H04L 65/103; H04L 12/2874; H04N 21/6118; H04N 21/23608; H04N 21/2365; H04N 21/434; H04N 21/4347; H04N 21/47202; H04N 21/6125; H04N 21/2221; H04N 21/236; H04N 21/23
(Continued)

(56) References Cited

U.S. PATENT DOCUMENTS

| 4,888,684 A | 12/1989 | Lilja et al. |
| 6,563,821 B1 * | 5/2003 | Hong et al. .................. 370/389 |

(Continued)

OTHER PUBLICATIONS

Data-Over-Cable Service Interface Specifications DOCSIS 3.0 CM-SP-PHY 3.0-I01-060804 Aug. 4, 2006.*

*Primary Examiner* — Shaq Taha
*Assistant Examiner* — Lionel Preval
(74) *Attorney, Agent, or Firm* — Stewart M. Wiener

(57) ABSTRACT

A flow bonder at a CMTS and another at a cable modem distribute packets of a service flow over multiple channels and collect them in the downstream direction respectively; vice versa in the upstream direction. The service flow may include video and data streams that are provided to the CMTS via an IP network. IP header information is stripped form video packets and remultiplexed with packets of other video streams. The remultiplexed video stream packets are combined into a composite stream, which is transported using multiple bonded-flow RF channels over an HFC.

A set top box receives the composite stream and separates data from video packets based on IP information. Video packets are assembled according to information from a multiple program transport stream table based on a program selected by a user.

14 Claims, 8 Drawing Sheets

Related U.S. Application Data

(60) Provisional application No. 60/599,977, filed on Aug. 9, 2004, provisional application No. 60/645,719, filed on Jan. 21, 2005.

(51) Int. Cl.
  *H04N 21/61* (2011.01)
  *H04N 21/643* (2011.01)
  *H04N 21/647* (2011.01)

(52) U.S. Cl.
  CPC ..... *H04N 21/6118* (2013.01); *H04N 21/6125* (2013.01); *H04N 21/64322* (2013.01); *H04N 21/64707* (2013.01)

(58) Field of Classification Search
  USPC ....... 370/352, 535, 389, 401, 468, 444, 229,
   370/474; 725/82, 120, 111, 118, 122,
   725/126, 31; 709/231, 238; 455/500
  See application file for complete search history.

(56) References Cited

U.S. PATENT DOCUMENTS

| | | | |
|---|---|---|---|
| 6,636,955 B1 | 10/2003 | Kessler et al. | |
| 6,704,372 B2 * | 3/2004 | Zhang | H04N 21/42607 348/E5.003 |
| 6,804,251 B1 * | 10/2004 | Limb | H04L 12/66 370/444 |
| 6,928,656 B1 * | 8/2005 | Addington | 725/111 |
| 7,039,048 B1 * | 5/2006 | Monta | H04L 12/2801 370/389 |
| 2002/0002636 A1 | 1/2002 | Vange et al. | |
| 2002/0034162 A1 | 3/2002 | Brinkerhoff et al. | |
| 2002/0059426 A1 | 5/2002 | Brinkerhoff et al. | |
| 2002/0103919 A1 * | 8/2002 | Hannaway | 709/231 |
| 2002/0131403 A1 | 9/2002 | Desai et al. | |
| 2002/0131426 A1 * | 9/2002 | Amit | H04L 12/2801 370/401 |
| 2002/0132629 A1 * | 9/2002 | Desai | H04L 12/2801 455/500 |
| 2002/0133618 A1 * | 9/2002 | Desai et al. | 709/238 |
| 2003/0039211 A1 | 2/2003 | Hvostov et al. | |
| 2003/0058885 A1 * | 3/2003 | Sorenson | H04J 4/00 370/468 |
| 2003/0083054 A1 | 5/2003 | Francesca et al. | |
| 2003/0223466 A1 | 12/2003 | Noronha et al. | |
| 2004/0019876 A1 | 1/2004 | Dravida et al. | |
| 2004/0037286 A1 | 2/2004 | Huang et al. | |
| 2004/0062198 A1 | 4/2004 | Pedersen et al. | |
| 2004/0076181 A1 * | 4/2004 | Pantelias | H04L 69/14 370/468 |
| 2004/0141510 A1 | 7/2004 | Blanc et al. | |
| 2004/0143593 A1 | 7/2004 | Le Maut et al. | |
| 2004/0163129 A1 * | 8/2004 | Chapman | H04H 20/79 725/126 |
| 2004/0170176 A1 | 9/2004 | Kadambi et al. | |
| 2004/0172658 A1 * | 9/2004 | Rakib et al. | 725/120 |
| 2004/0181811 A1 * | 9/2004 | Rakib | H04L 63/062 725/122 |
| 2004/0208181 A1 | 10/2004 | Clayton et al. | |
| 2004/0240446 A1 * | 12/2004 | Compton | 370/389 |
| 2004/0244043 A1 * | 12/2004 | Lind | H04L 12/2801 725/111 |
| 2004/0257997 A1 | 12/2004 | Loewen et al. | |
| 2005/0068992 A1 * | 3/2005 | Kaku et al. | 370/535 |
| 2005/0091396 A1 | 4/2005 | Nilakantan et al. | |
| 2005/0097612 A1 * | 5/2005 | Pearson et al. | 725/82 |
| 2005/0114900 A1 | 5/2005 | Ladd et al. | |
| 2005/0265376 A1 | 12/2005 | Chapman et al. | |
| 2005/0265392 A1 * | 12/2005 | Fox et al. | 370/474 |
| 2006/0002294 A1 * | 1/2006 | Chapman et al. | 370/229 |
| 2006/0062200 A1 * | 3/2006 | Wang et al. | 370/352 |
| 2006/0130113 A1 * | 6/2006 | Carlucci | H04N 7/17318 725/118 |
| 2009/0150923 A9 * | 6/2009 | Patariu | H04N 21/4183 725/31 |

\* cited by examiner

1

METHOD AND SYSTEM FOR TRANSFORMING VIDEO STREAMS USING A MULTI-CHANNEL FLOW-BONDED TRAFFIC STREAM

CROSS REFERENCE TO RELATED APPLICATION

This application is a continuation-in-part of U.S. patent application Ser. No. 11/200,313 entitled "Very high speed cable modem for increasing bandwidth," filed Aug. 9, 2005, which is incorporated herein by reference in its entirety, and which claims the benefit of U.S. Provisional Application No. 60/599,977, filed Aug. 9, 2004; this application also claims the benefit of U.S. Provisional Application No. 60/645,719 entitled "Method and system for combining a multi-channel receiver with a digital set top box," filed Jan. 21, 2005, which is incorporated herein by reference in its entirety.

FIELD OF THE INVENTION

This invention relates, generally, to communication networks and devices and, more particularly, to using the increased bandwidth capability of a flow bonded cable modem to deliver video traffic.

BACKGROUND

Data-Over-Cable Service Interface Specifications ("DOCSIS") has been established by cable television network operators to facilitate transporting data traffic, primarily internet traffic, over existing community antenna television ("CATV") networks. In addition to transporting data traffic as well as television content signals over a CATV network, multiple services operators ("MSO") also use their CATV network infrastructure for carrying voice, video on demand ("VoD") and video conferencing traffic signals, among other types.

In transporting downstream multimedia content, as well as data, an upstream message, or messages, is/are typically sent to request the content and to set up a service flow to deliver the content. In addition to downstream multimedia content, such as video, voice traffic also uses message signaling to set up service flows for the upstream and downstream directions.

These signals are typically sent over a fiber network to a location, sometimes referred to as a node, near an end user, and from the node to a broadband user's device via a coaxial cable. Such an arrangement is known in the art as a hybrid fiber coaxial network ("HFC"). To illustrate, FIG. 1 shows a conventional system 2 for communicating between a cable modem termination system ("CMTS") 4 at a head end and a cable modem ("CM") 6 at a user location, such as a home or office. The CMTS 4 and cable modem communicate over hybrid fiber coaxial network 8. When a user requests information, for example from Internet 10, Internet protocol ("IP") packets are received from the Internet at physical layer interface ("PHY") 12 and routing/switching functionality is provided by routing/switching processor 14. From processor 14, a DOCSIS header is added and radio frequency ("RF") processing takes place at media access control ("MAC") processor 16 before being transmitted onto HFC 8 toward cable modem 6. It will be appreciated that the MAC and radio circuitry are typically separate devices/circuits, but are combined into one block in the figure for simplicity.

At cable modem 6, the packet is received at CM MAC processor 18, which performs RF functionality as well as DOCSIS processing. IP processing takes place at routing/switching processor 20, and the packet is forwarded to Ethernet interface 22 for final transport to a customer premise equipment ("CPE") user device, such as, for example, a computer, a television or a set top box.

A shown in FIG. 1, only one downstream channel between CMTS 4 and CM 6 is used because only one MAC processor is used at each. A channel is typically a 6 MHz RF channel as known in the art. Although an HFC channel between a CMTS and a CM provides an increase in performance over using a dial-up connection, customers are demanding more and content, thus requiring even more bandwidth than a single channel over an HFC can accommodate. Thus, there is a need in the art for a method and system for increasing bandwidth over the bandwidth that is provided by a single HFC network channel, while using as much currently available components as possible.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
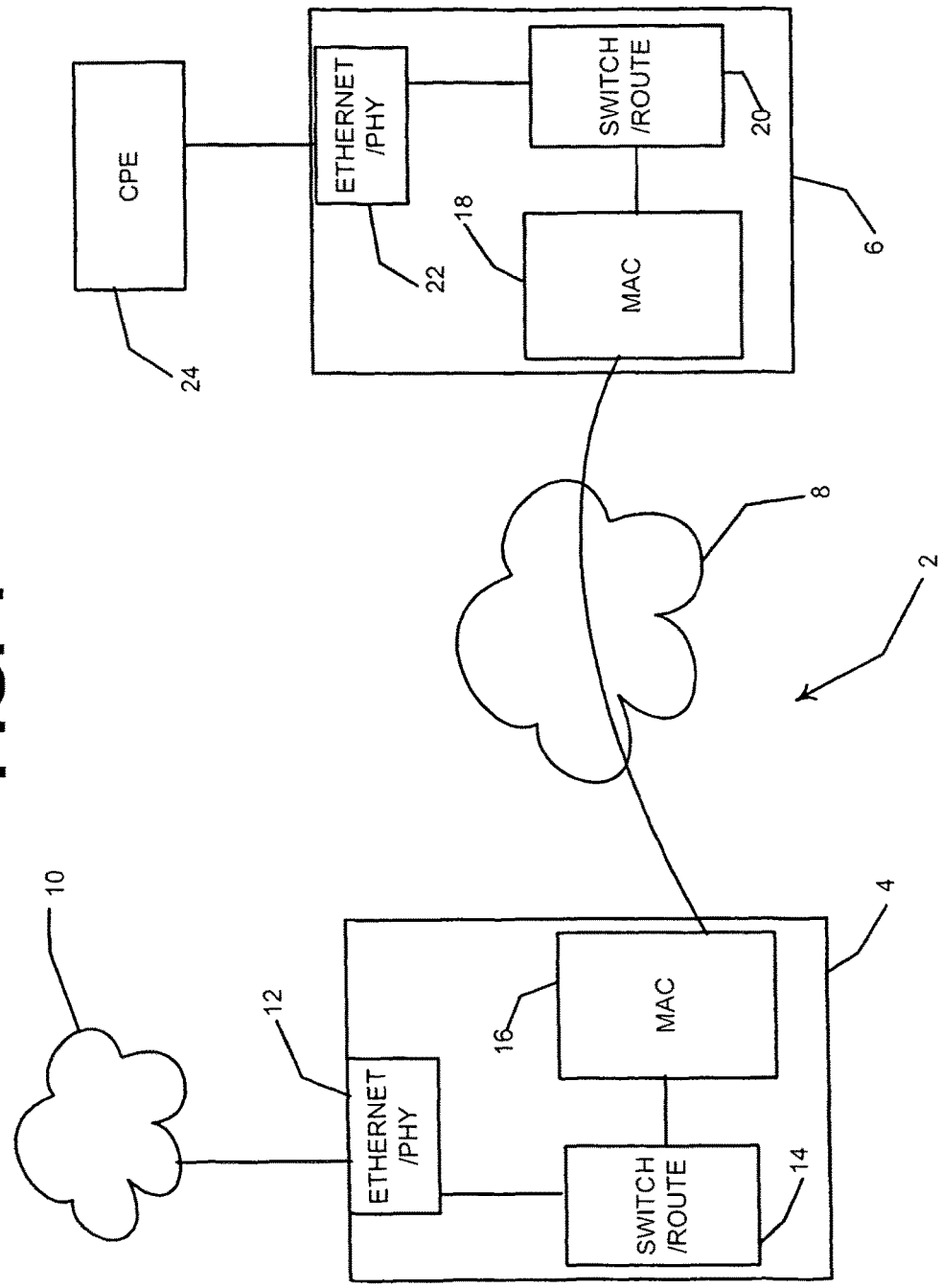
FIG. 1 illustrates a system for communicating a service flow over a single HFC channel.
Figure 2:
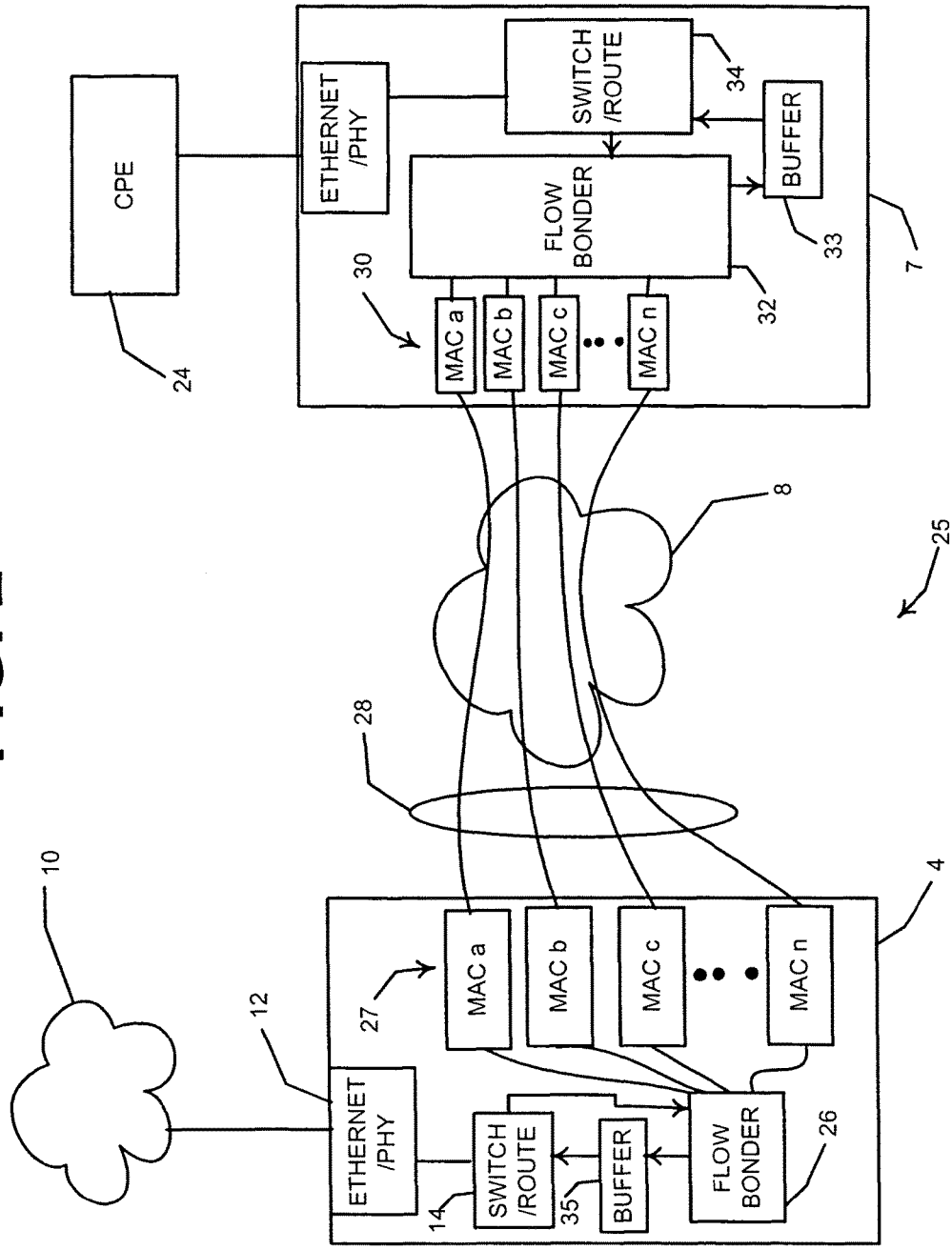
FIG. 2 illustrates a system for communicating a service flow over multiple HFC channels.

Turning to FIG. 2, a system 25 for increasing bandwidth in both the upstream and downstream directions is show. Similar to the description of FIG. 1, requested content from network 10, which may be the internet, a video server or antenna farm, or a voice network, for example, is received at PHY 12 and processed by routing/switching processor 14. However, from processor 14, packets are sent to flow bonder 26. Flow bonder 26 may be referred to as a distributor in the downstream direction and a collector in the upstream direction. Flow bonder 26 may comprise hardware, software and/or firmware.

In the downstream direction, distributor 26 determines that a given packet belongs to a particular service flow. As will be discussed in greater detail in connection with other figures, CMTS 4 and cable modem 7 determine during set up of a service flow that the service flow should use the high bandwidth capabilities as discussed herein. When CMTS 4 has determined that a particular service flow is to use the high bandwidth capabilities, a service flow identifier is associated with the service flow and is embedded into every packet that makes up the service flow. Determination that packets are part of a particular service flow may be accomplished at processor 14 based on source and destination addresses, session identifiers and/or other techniques known in the art.

The service flow identifier that is associated with and assigned to each packet that composes the service flow is placed into the packet at a standard location within the packet. Such a location my be the Ethernet header, the DOCSIS header, or other repeatable location within the packet as known in the art. After the service flow identifier has been placed into a given packet, distributor 26 also places a sequence identifier number into the packet, preferably in a location within the packet that is near the service flow identifier. The sequence identifier is assigned sequentially as packets are received from processor 14. Each sequence identifier is unique within the service flow, and the number increments for each successive packet that is received.

Distributor 26 sends packets to multiple MAC processors 27. The number of MAC processors 27 is determined based on an MSO's preference, but will typically be limited by available integrated circuits. However, if more MAC processors 27 are desired than are available in application specific integrated circuit ("ASIC"), then multiple single-channel MACs may be used, although this would typically be more complicated to design and more costly than an ASIC designed for the desired number of channels.

Packets are distributed, or scheduled, to multiple MAC processors 27 according to an algorithm based on the sequence number contained in the packet. For example, a round robin algorithm may distribute packet a packet with sequence number 1 to MAC 27a, a packet with sequence number 2 to MAC 27b, a packet with sequence number 3 to MAC 27c, and a packet having sequence number 4 to MAC 26n (with "n" designating the total number of MACs 27). If n=4, then distributor 24 would send the next packet, having sequence number 5, to MAC 27a, and the pattern would continue. It will be appreciated that such a round robin distribution algorithm is one example of how packets may be distributed to MACs 27, and other algorithms may be used to achieve desired packet traffic load balancing, as well as other traffic engineering conditions. Thus, since the four channels 28 corresponding to the four MAC processors 27 are carrying what would otherwise be carried by a single HFC channel, the downstream bandwidth has theoretically been increased fourfold, depending on the algorithm that is used to meet desired traffic engineering conditions.

When the packets arrive at CM 7 over HFC channels 28, a number of MAC processors 30, corresponding to the number of MAC processors 27 at CMTS 4, receive the packets. Flow bonder 32 operates in the downstream direction as a collector, because it 'collects' the packets that were distributed across the multiple channels 28 and places them back into their proper order. This process may be referred to as resequencing. Accordingly, collector 32 may also be referred to as a resequencer.

Resequencer/collector 32 stores received packets to resequencing buffer 33. It will be appreciated that flow bonder 26 at CMTS 4 similarly stores packets received in the upstream direction to buffer 35. As a packet is received from one of the MAC processors 30, the identification information, including the service flow identifier and the sequence number identifier, are evaluated to determine what service flow it belongs to and its proper sequence within this associated service flow. After this information has been evaluated, the packet is placed into buffer 33 where it awaits its turn to be forwarded toward routing/switching processor device 34. If the packet stored in buffer 33 is the next packet that needs to be sent toward processor 34 according to the sequence number contained in the packet as described above (e.g., if the most recent packet sent had sequence number 13 and the packet currently stored in the buffer has sequence number 14), then it is sent.

If, however, the packet stored in buffer 33 is not the next packet that needs to be sent (e.g., the most recently sent packet has sequence number 13, but the packet currently stored in the buffer is 15), then the collector waits a predetermined amount of time $T_S$. The period $T_S$ is preferably based on a maximum skew time—as discussed in more detail below—but may be selected based on other criteria as preferred by an MSO. By waiting for predetermined period $T_S$ so that the next packet to be sent (having sequence number 14 in the scenario given above) can be received, packets are forwarded toward CPE 24 in the order in which they were sent by distributor 26. When a packet that belongs to the same service flow as the packet that is currently stored in the buffer and that has sequence number identifier 14 is received, it is stored to a different buffer location and then sent. It will be appreciated that buffers 33 and 35 can store more than one packet. Following the sending of the packet having sequence identifier 14 in the scenario given as an example, the packet that was previously stored to the buffer having sequence identifier 14 is sent. Thus, packets are sent from buffer 33 in the order in which they were scheduled by distributor 26, even if they do not arrive at collector 32 in this same order.

The maximum skew period may be determined as follows. When this relative time measurement associated with each different combination of channel pairs, the maximum value, referred to as cross-channel skew, is determined as follows: cross-channel skew=max(|transmission_time$_i$–transmission_time$_j$|), where transmission_time$_i$ is the amount of time that it takes for a packet to travel from CMTS 4 head end to cable modem 7 over channel i, and transmission_time$_j$ is the amount of time that it takes for a packet to travel from the CMTS to the cable modem over channel j, channels i and j being the two channels being evaluated. Thus, whatever the maximum value of the differences between channel transmission times for all the different channel pair combinations is the maximum cross channel skew value.

Assuming that there is negligible queuing latency per channel, the transmission time for a given channel can be shown to be a function of packet length and bandwidth capacity of the channel. Therefore, transmission_time$_i$=packet_length$_i$/bandwidth$_i$. Over time, the length of the packet to be transmitted statistically tends to be the same across each bonded channel. Thus, the cross-channel skew turns out to be a function of the relative bandwidths of the channels. Using the assumptions above, the reassembly/resequencer timer period $T_S$, as discussed above, is typically selected just large enough to account for cross-channel skew.

In selecting the value to use for $T_S$, the largest bandwidth that can typically be achieved in the downstream direction on an Annex B DOCSIS channel is about 42 Mbit/sec. The corresponding smallest bandwidth is about 30 Mbit/sec. Thus, assuming a maximum packet size of 1522 bytes, the timer period $T_S$ would be set to just exceed $((1522*8)/(30 \text{ Mbit/s})) - ((1522*8)/(42 \text{ Mbit/s}))$, or approximately 116 µs.

In the upstream direction, the largest bandwidth is about 30 Mbit/s and the smallest bandwidth is about 0.32 Mbit/s. Thus, assuming a packet size of 1522, the maximum value of Timer $T_S$ would just exceed $((1522*8)/(0.32 \text{ Mbit/s})) - ((1522*8)/(30 \text{ Mbit/s}))$, or approximately 37.7 ms. Since the modulation profile of each of the bonded channels is available at the CMTS, timer $T_S$ may be adjusted for each CM so as to just exceed the cross-channel skew across the bonded channels. However, if queuing causes jitter across the channels, an additional component may be added to the selectable predetermined resequencer timer period $T_S$.

To facilitate flow bonding, traditional CMTS components may be controlled using modified software or firmware to operate multiple DOCSIS MACs corresponding to multiple channels for improving bandwidth. Such an arrangement may be referred to as a channel-bonding CMTS. At the cable modem, a channel-bonding cable modem also uses multiple DOCSIS controllers/processors, or MACs, corresponding to the multiple channels. It will be appreciated that the CMTS and the cable modem need not use the same number of MAC processors.

Each of the DOCSIS MAC controllers 30 within a channel bonding CM is referred to as a contributing cable modem ("CCM"). As discussed above, some of the elements in a channel bonding modem are illustrated in FIG. 2 that shows a channel bonding CM 7 with several CCMs 30. In a channel bonding CM, each CCM operates independently as a cable modem. Each CCM has its own MAC and IP address. Each CCM is independently manageable via SNMP. Each CCM can manage its own DOCSIS resources. Thus, a cable modem can use standard DOCSIS 1.1 or 2.0 (i.e., mass-produced and inexpensive) DOCSIS CM ASICs. Thus, currently available MAC processor ASICs may be used, but MSOs can easily transition to single ASICs that integrate multiple DOCSIS MAC processor engines as they become available.

Although each CCM 30 is basically a stand-alone cable modem, channel bonded channels from a CMTS may be configured so that only one 'master' channel of a set of channel bonded channels carry conventional DOCSIS messages. This is so that legacy DOCSIS modems that are connected to HFC 8 do not lock to the associated 'slave' channel. This facilitates full usage of the channel-bonded channels to channel bonded capable cable modems. However, as discussed later, this feature may be disable so that legacy modems can lock to these 'slave' channels from the CMTS.

It will be appreciated that a tuner is typically associated with a cable modem, and thus, each CCM will typically have separate tuner circuitry associated with it. However, if an MSO designs its channel frequency plan such that the multiple channels used in a bonded flow arrangement between the CMS and cable modem have adjacent center frequencies, then a block downconverter may be used. This allows all the adjacent channels to be downconverted to a lower intermediate frequency by a single component, thus reducing the number of components used in a corresponding ASIC. However, if an MSO wishes to maintain flexibility in assigning its channel frequencies, then each CCM will typically have a complete set of tuning circuitry associated with it.

Each CCM within an channel bonding CM indicates its bonding flow capability in its advertised modem capabilities type length value ("TLV") of the REG-REQ, as referenced in section C.1.3.1 of DOCSISRFI, as familiar to those skilled in the art. This capability is signaled to the CMTS with a bonding indicator TLV added to the modem capabilities information provided upon registration. For example, a bonding indicator TLV of 0 might indicate that flow bonding is not supported, while a TLV of 1 might indicate that flow bonding is supported. Each CCM also indicates its flow bonder's identification address TLV (type TBD) in the REG-REQ message. The field containing this TLV is preferably a 6-octet integer that uniquely identifies the flow bonder with which this particular CM instance is associated. The preferable method for assigning this value is to statically choose one of the CCM MAC addresses to be the "master" and then report that "master" MAC address as the flow bonder ID for all MAC processors associated with that particular flow bonder.

Since flow bonding will more than likely require the use of one or more limited resources in both the CM and the CMTS, the request for these resources is signaled and acknowledged before a service flow is set up. Upon receipt of a dynamic flow request with a flow bonding indicator TLV, the receiving device must verify that no other bonded service flow to the destination device's flow bonder exists with the same bonded service flow ID. Then the local flow bonder should be made aware of the request so that it may perform necessary bookkeeping.

A bonded service flow identifier value of zero is reserved for the case of a provisioned bonded flow. Upon receipt of a provisioned flow set with a bonded service flow identifier of zero, the CCM will register with the settings that are provided in the CCM's modem configuration file. In this case, the provisioned set flow parameters should be set with the maximum size of the desired bonded flow. The admitted and active set flow parameters should be set to some nominal value to allow CCM registration. As CCMs register, the flow bonder intelligently initiates attempts (via DOCSIS Dynamic Service Change messages) to increase the provisioned, admitted, and activated service flow parameters across the registered CCMs to meet the bonded flow parameters. The flow bonder assigns a non-zero bonded service flow identifier to the bonded service flow before the flow becomes active. It will be appreciated that only one flow in each direction in a CCM's cable modem configuration file may include a bonded flow indicator TLV.

The REG-REQ message for each CCM contains the flow bonding support modem capabilities TLV (enabled) as well as the flow bonder indicator TLV. If the CMTS supports flow bonding, the REG-ACK response will also contain an enabled modem capabilities TLV with flow bonding enabled. The CMTS identifies which DOCSIS CCMs are associated with a common flow-bonding CM by correlating the flow bonder identifiers. The CMTS determines how the CCMs of a given bonded-flow-capable modem are distributed across multiple DOCSIS channels to meet bandwidth demands. Thus, as mentioned above, even if a cable modem has six CCMs that can be used for bonded flow traffic, it may be desirable to provision only four CCMs for a service flow being set up based on network traffic at the time of service flow setup.

Bonded service flows may be provisioned via the cable modem configuration file by specifying two parameter sets for the flow. For example, first, the desired bonded service flow parameters are specified in the flow's provisioned set. Next, a smaller flow parameter set that will allow the CCM to register on a single DOCSIS channel is specified for the admitted and active parameter sets of the flow. Both parameter sets include the bonded service flow indicator parameter having a value of zero.

For an example illustrating setup in the upstream direction, a method by which the bonded cable modem may properly register and then establish a large bonded flow is described. Assume that a configuration file is provisioned as follows:

Provisioned Set
Upstream Maximum Sustained Traffic Rate=100 Mbps
Minimum Reserved Traffic Rate=50 Mbps
Admitted, active sets
Upstream Maximum Sustained Traffic Rate=12 kbps
Minimum Reserved Traffic Rate=4 kbps During each CCM's 30 DOCSIS registration, all TLVs from each CCM which contain bonding information are passed to flow bonder 26 at CMTS 4. Each CCM 30 registers using the channel bonding cable modem flow bonder 32 identifier address with a large (bonded) provisioned parameter set and a relatively small admitted and active parameter set for the upstream flow. Until a sufficient number of CCMs have registered for the channel bonding cable modem, the bonded flow request is not granted.

Once the CMTS flow bonder 26 has determined that enough CCMs 30 using the same channel bonding CM flow bonder 32 identifier address have registered, it will trigger a DOCSIS Dynamic Services Change ("DSC") request on each DOCSIS channel to admit, but not yet activate, a portion of the necessary bandwidth. Once enough bandwidth has been successfully admitted across all of the necessary channels to satisfy the bonded flow requirements, the CMTS' flow bonder 26 will trigger DSC requests to activate all of the admitted bandwidth. As CCMs 30 are added or deleted as bandwidth utilization on any particular channel changes, the CMTS flow bonder 26 may interact with the load balancing processes operating within CMTS 4 to modify the initial flow bonding bandwidth assignments through the use of DSC signaling to the CCMs. CMTS 4 typically establishes a large bonded downstream flow in a similar fashion.

The above-described aspects can be incorporated to function with the PacketCable Multimedia framework as known in the art. By extending the notion of a PacketCable Multimedia Gate to provide services at the bonded-flow level rather than at the DOCSIS flow level, the CMTS could be made to be responsible for allocating bandwidth across all of the DOCSIS channels (multi-channel admission control) that a subscriber's equipment has access t, based on the subscriber's equipment identifier. The per-DOCSIS flow characteristics may be automatically manipulated by the CMTS to provide the requested service.

Figure 3:
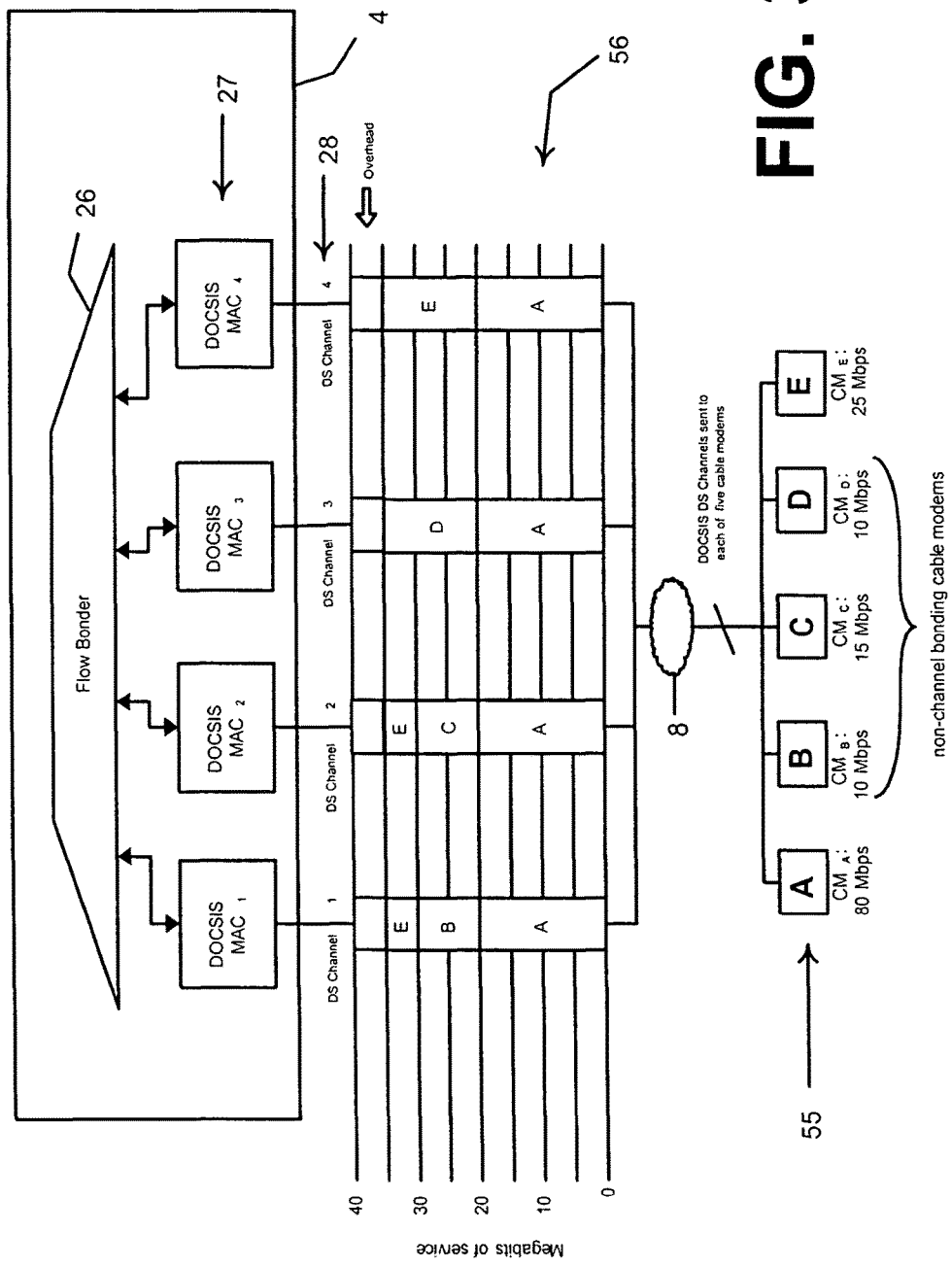
FIG. 3 illustrates a multi-channel downstream arrangement providing service to five flow-bonded modems.

An example shown in FIG. 3 illustrates an arrangement where flow bonder 26 at CMTS 4 transmits a service flow over bonded flow multiple channels 28 over HFC 8 to a group of cable modems 55. Channel distribution chart 56 shows that all four downstream channels corresponding to the four bonded MAC processors 27 at CMTS 4 are provisioned to carry information to cable modem 55A. However, only the first downstream channel carries a service flow to modem 55B and the second downstream channel carries a service flow to modem 55C. Modem 55E receives its respective service flow over the first, second and fourth channels, as shown by chart 56. Thus, it will be appreciated that depending upon the flow requirements of a particular cable modem in group 55, as transmitted in a cable modem's REG-REQ message to establish a given service flow, CMTS 4 determines which channels are to be used to deliver the flow based on the flow requirements and the current channel usage so as to facilitate balancing the load on the bonded-flow channels.

In this illustrated example, modems 55A and 55E are flow-bonding capable while modems 55B-D are legacy modems that are not flow-bonding capable. A subscriber connected to modem 55A requests a service requiring eighty megabits of service. At that particular time when the request is received at CMTS 4, the four downstream channels are underutilized; therefore an aggregate of eighty megabits of flow are granted evenly across all four downstream channels. Next, a subscriber using modem 55B requests a ten megabit service and, because modem 55B does not support flow-bonding, the request is granted using only one channel, in this case the first downstream channel. Next, a subscriber using modem 55C requests ten megabits of service and is granted using the second downstream channel. Then a subscriber using modem 55D requests and is granted fifteen megabits of bandwidth on the third downstream channel. Finally, a subscriber using cable modem 55E requests twenty-five megabit service. Now, the system does not have the capacity on all four channels to split the bonded service flow to modem 55E evenly across all four channels. Thus, it grants the request by using the remaining fifteen megabits on the fourth downstream channel and the remaining five megabits on each of the first and second downstream channels. Accordingly, channel bonding and non-channel bonding cable modems are supported by the same CMTS, and channels used for bonded flows carry traffic for non-bonded service flows as well, with the load balanced across all four of the channels.

The scheduling and collecting of packets as described above with respect to traffic flowing in the downstream direction operates in the upstream direction as well. In the upstream direction, CM 7 shown in FIG. 2 is the originating device and CMTS 4 is the destination device, as opposed to the CMTS being the originating device and the cable modem being the destination device, as is the case in the downstream traffic flow scenario described above. Thus, flow bonder 32 operates as the packet bonding distributor and flow bonder 24 acts at the bonding collector in the upstream direction. It will be appreciated that each flow bonding device is similar, or possibly even an identical device (either a discrete integrated circuit, firmware formed in a field programmable gate array, software controlled by a processor central to the origination/destination device, or a combination of some or all of the above).

Figure 4:
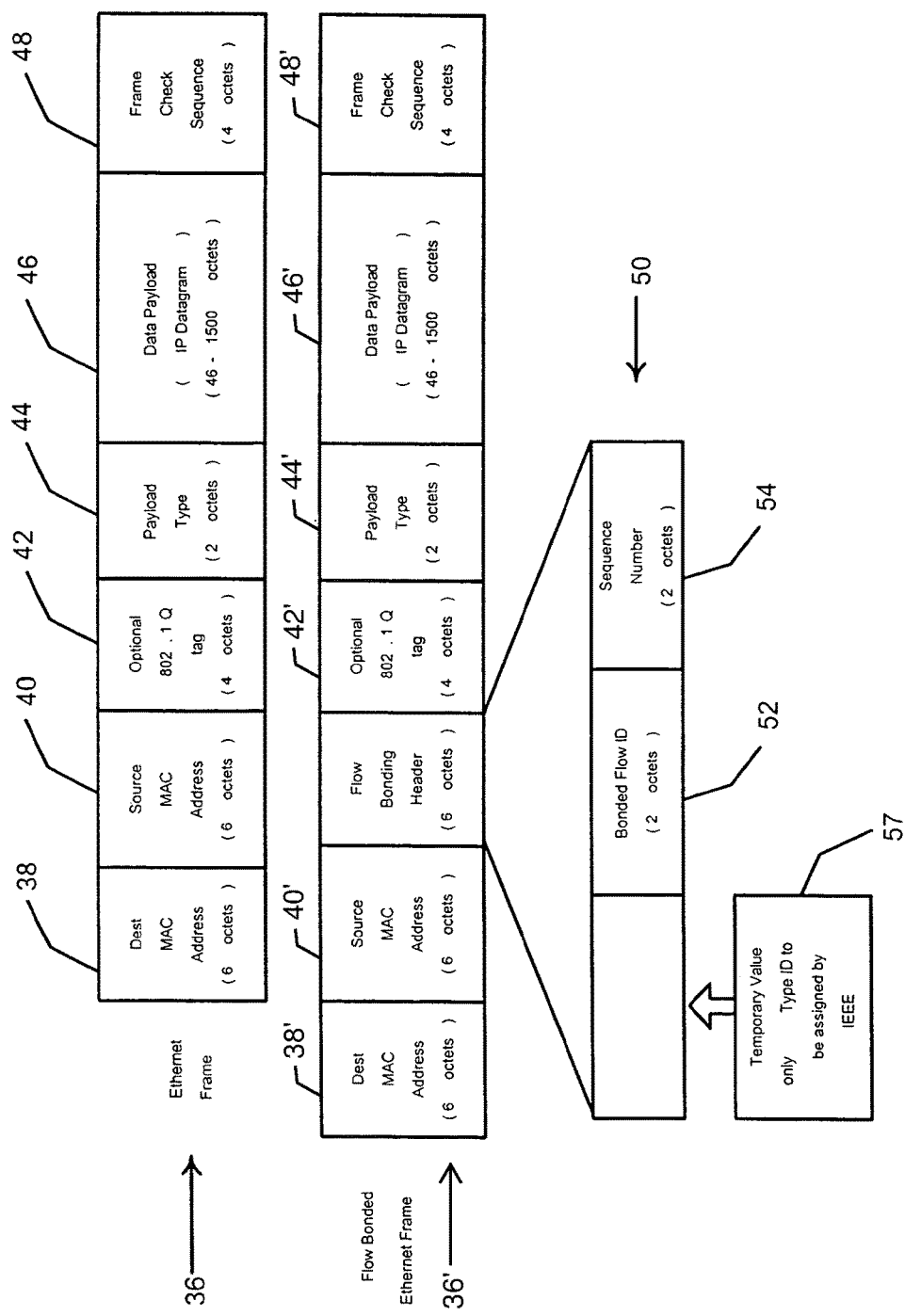
FIG. 4 illustrates an Ethernet frame arrangement having a flow-bonding header.

Turning now to FIG. 4, the location of a service flow identifier and a sequence number identifier are shown within a typical Ethernet frame. A typical Ethernet frame 36 includes a destination MAC address 38, a source MAC address 40, possibly an 802.1Q tag 42 as known in the art, a payload type identifier 44, payload 46 and a frame check sequence identifier 48. When multiple channels are bonded together, either in the upstream direction or the downstream direction, flow bonding header 50 is assigned and placed between the source MAC address 40 and the optional 802.1Q tag 42. Within flow bonding header 50 are the bonded service flow identifier 52, as described above, and the sequence number identifier 54 as described above. The service flow identifier 52 and the sequence number identifier 54 are both typically two-byte (typically octets) identifiers that are assigned during setup of the service flow and as packets are distributed at the flow bonder, respectively. In addition to the service flow identifier 52 and the sequence number identifier 54, a type identifier (TLV) 57 may be inserted before them. Type identifier 57 identifies the flow bonded packet as such to the receiving flow bonder.

Thus, a bonded service flow is identified by a series of packets flowing from the transmitting flow bonder to the receiving flow bonder with each packet containing a flow bonding header with the same bonded service flow identifier. Each bonded flow is independently managed by the transmitting flow bonder. Once a new bonded flow is created by the transmitting flow bonder, the transmitting flow bonder assigns to packets in the bonded flow a new bonded flow identifier. Preferably, newly created bonded flows begin with a bonded service flow sequence number identifier of zero in the first packet. Subsequent packets preferably have corresponding sequence number identifiers that are consecutively incremented as each sequence number identifier is assigned.

Figure 5:
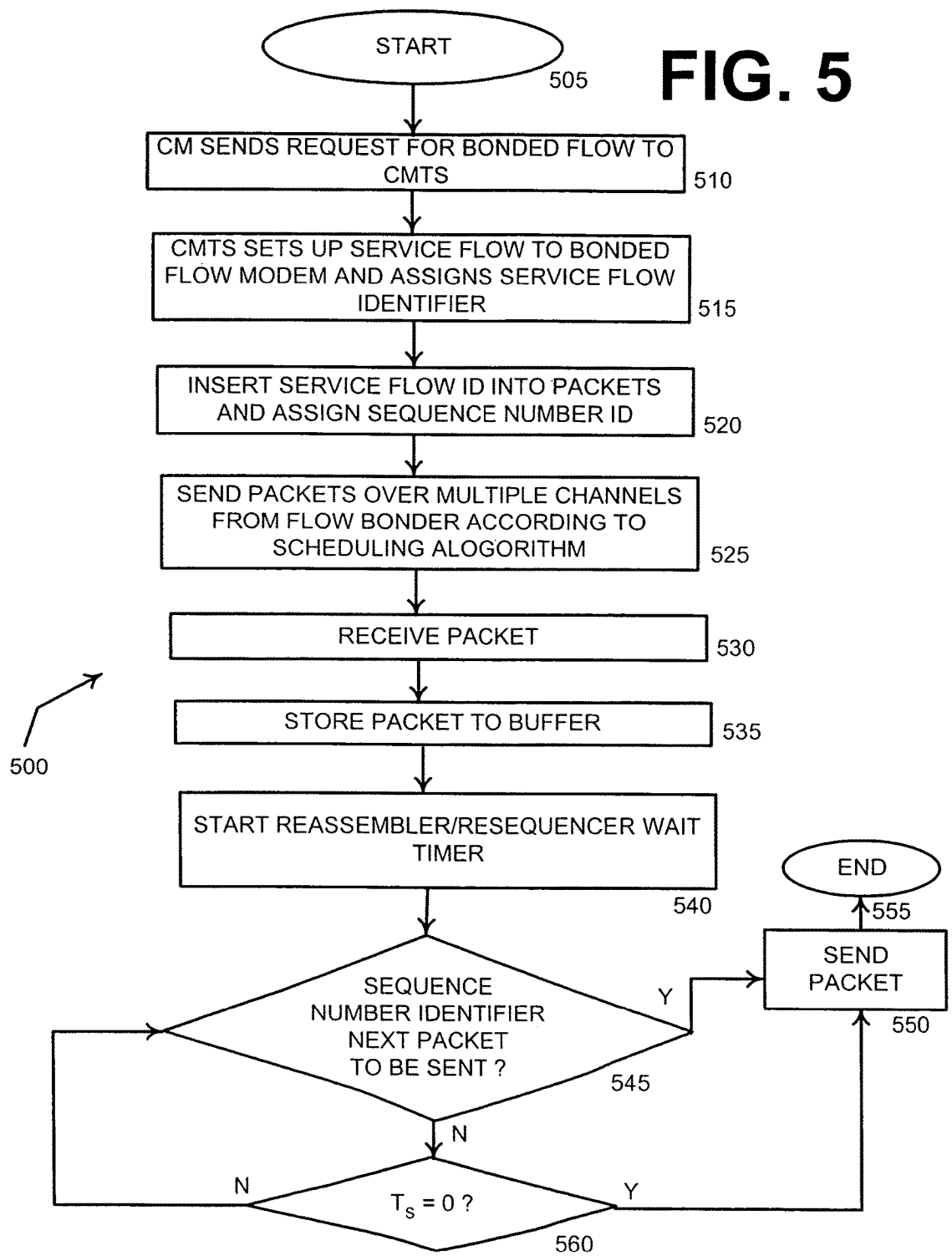
FIG. 5 illustrates a flow diagram of a method for transporting communication signals between a CMTS and a cable modem over multiple channels of an HFC.

Turning now to FIG. 5, a method 500 for transmitting a service flow over multiple channels is shown. After starting at step 505, a cable modem sends a service flow request message to the CMTS at step 510. The CMTS sets up the service flow between it and the cable modem at step 515. It will be appreciated that the service flow being set up may be a flow in the upstream direction or the downstream direction. At step 515, the CMTS determines the bandwidth requirements of the requested flow, and determines whether multiple bonded channels are needed for the flow. For example, if the requested content is a downstream transmission of a full length video movie, all available bonded flow channels between the CMTS and the cable modem may be used. If, however, the requested flow is a web page, the CMTS may only set the service flow up for single channel operation, even if multiple channels are available.

After the CMTS has set up/provisioned the service flow, packets composing (making up) the flow are identified as being part of a multi-channel bonded flow, if the flow is indeed provisioned as a multi-channel flow. To identify a multi-channel flow, a service flow identifier that is unique from all other service flows going to the destination device is assigned to the flow. This service flow identifier is inserted into the Ethernet frame header, or other portion of the packet as may be desirable, of a given pack of the flow at step 520. In addition to inserting the service flow identifier into the Ethernet frame, the CMTS also inserts a sequence number identifier in the Ethernet frame header at step 520. With respect to other packets within the service flow, the sequence number identifier corresponds to the order of the particular packet to which it is assigned.

After the service flow identifier and the sequence number identifier have been assigned/inserted into the Ethernet frame header of a packet, it is transmitted from the originating device (CMTS in the downstream direction, cable modem in the upstream direction) towards the destination device over one of the multiple bonded channels at step 525. The channel over which a given packet is transmitted is determined by the scheduling algorithm, which preferably is a round robin algorithm. However, depending upon current traffic loading and the channels which are provisioned for the particular service flow, different methods of determining the channel that will carry a packet may be used. For example, if channel one is otherwise less used than the other three in quad-bonded multi-channel arrangement, packets with sequence numbers one and two may be sent over channel one, the packet having sequence number three over a second channel, the packet having sequence number four over a third channel and the packet having sequence number five over the fourth channel. Then, the pattern would repeat. Thus, channel one would carry more of the flow's packets than the other three channels, which may be carrying other traffic and thus are otherwise more loaded than channel one.

After a packet is transmitted from the originating device according to the scheduling algorithm, it is received at the destination device at step 530. When the destination device receives the packet, the packet is stored to a resequencing buffer at step 535. Processors in the destination device keep track of the sequence numbers of packets sent out. By evaluating the sequence number of the packet retained in the buffer, the destination device can determine whether it is the next one in the sequence to be sent to the end device, such as a computer, television, set top box, etc., at the subscriber location, for example.

A wait counter is started at step 540. The wait counter operates for a predetermined period $T_S$, which is typically the programmed skew time as discussed above. If evaluation at step 545 of the sequence number of the packet stored in the resequence buffer indicates that the packet is the next one to be sent, the packet is sent from the resequencing buffer at step 550 and process 500 ends at step 555.

However, if evaluation at step 545 indicates that the packet stored in the resequence buffer is not the next packet to be sent to the user/subscriber device, a determination is made at step 560 whether the wait counter has counted down to zero. If not, process 500 returns to step 545 to determine whether the next packet to be sent has been received and stored to the buffer. If so, process 500 proceeds to step 545 and step 550 as previously discussed.

If the next packet to be sent has not been received and stored to the resequenceing buffer, process 500 proceeds to step 560 and determines whether the wait counter has counted down to zero. If the wait counter has counted down to zero, process 500 proceeds to step 550 and sends the packet retained in the buffer. This is based on the assumption that the next packet to be sent must have been lost and will not be received. This is because the skew time $T_S$ is based on the maximum difference in transmission times between the channels of a given pair of channels. Since the packet has not been received during the maximum time it could have taken between receipt of the currently stored packet and the next one to be sent, it is assumed the next packet to be sent was lost.

It will be appreciated that although some of the steps shown in FIG. 5 may be performed out of the order shown in the figure, starting the wait timer at step 540 rather than immediately after the receiving of the packet at step 530 may provide an additional few clock cycles to the predetermined wait counter period $T_S$. In addition, other additional time may be added to the predetermined $T_S$, to account for other factors such as, for example, queuing latency.

Figure 6:
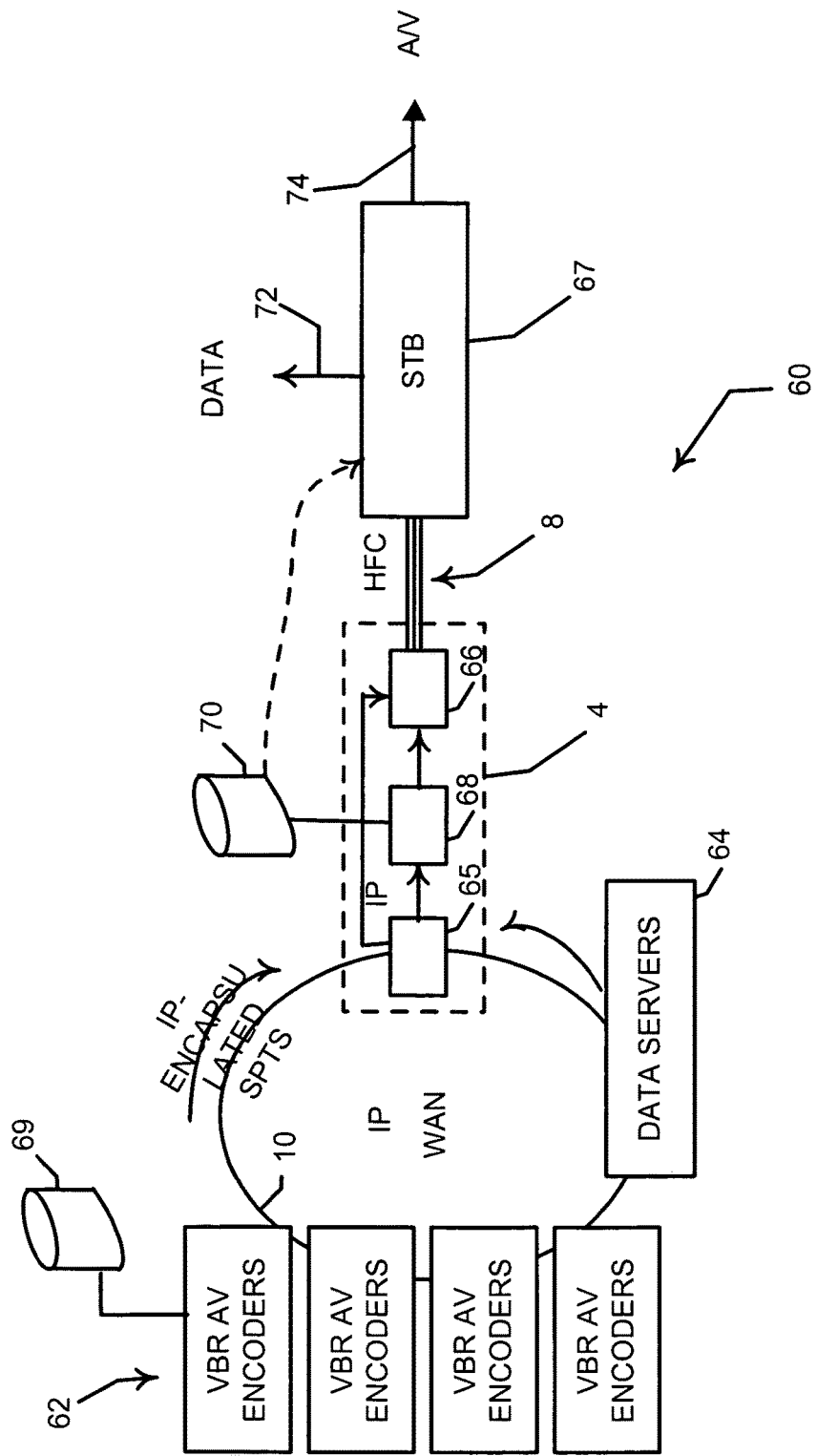
FIG. 6 illustrates a system architecture for delivering multiple flow-bonded video streams over a hybrid fiber coaxial communication network.

Turning now to FIG. 6, a network diagram is shown illustrating a system 60 for delivering video traffic and data traffic to a subscriber. Video encoders 62 and data servers 64 are coupled to flow bonding CMTS 4. Multiple digitally encoded video streams from encoders 62 and a data stream (s) from data encoders 64 are bonded together into a composite traffic stream. It will be appreciated that flow-bonding CMTS 4 is typically located at a service provider's head end location. It will further be appreciated that reference herein to video, video traffic and/or video programs may encompass multiple aspects of a "program" including audio, video and any supplementary data. Data servers 64 and encoders 62 may or may not be located at the head end.

Video encoders 62 may be variable bit rate encoders that compress raw digital video information according to MPEG-2 format, for example. These typically variable bit rate streams each may comprise an entire audio/video program, or preferably, be one of many streams that compose an audio/video program according to MPEG-2 transport. MPEG-2 and MPEG-2 transport, which generally refer to compression and delivery respectively, are known in the art and further discussion is not provided herein except as may be necessary to describe the embodiments disclosed herein. The encoders packetize the digital streams, which packets are provided to CMTS 4 via an internet protocol ("IP") network, such as, for example, the world wide web.

CMTS 4 receives the packetized video information from encoders 62, and packetized digital data from data servers 64, at IP filter 65. IP filter determines whether a given IP packet is a data packet or a video packet. If a packet is a video packet, the IP-related information, (e.g. header information, IP addresses, etc.) is stripped at IP filter 65. If a packet contains data, the data packet is forwarded to transmitting means 66, such as, for example, DOCSIS-capable channel-bonding CMTS circuitry as known in the art, and processes the information for delivery to set top box 67 over HFC 8. It will be appreciated that CMTS 4 refers generally to equipment, typically mounted in a rack, that includes IP filter 65, channel-bonding CMTS circuitry 66, MPEG multiplexer 68, power supplies, and other components known in the art that are associated with a CMTS. However, channel-bonding CMTS 66 refers to circuitry typically contained on a card, or blade, that performs switching/routing/RF tuning, etc. Thus, CMTS 4 refers generally to a CMTS and related components, and channel bonding CMTS 66 refers to the actual transmitting means that sends and receives signals over an HFC or similar network.

Using channel bonding methods and processes as described above, the MPEG multiplexer 68 combines multiple streams from servers 64 and encoders 62 into a multiplexed stream of a plurality of streams, which are typically single program transport streams, as known in the art. From these single program streams, each of which are typically associated with a setup table 69 containing information corresponding to the respective stream, a multiple program transport stream table 70 is generated by multiplexer 68. As known in the art, this type of information related to tables 69 and 70 may be typically transmitted downstream in IP packets. The multiplexed video streams, the multiple program transport stream table information packets and any data packets from server(s) 64 are combined into a composite stream at transmitting means 68 for transmission over HFC to set top box 67. This composite stream is preferably generated according to DOCSIS, as known in the art.

However, although the multiple streams are combined into a composite stream, the composite stream is transported between CMTS 4 and set top box 67 over multiple channels of HFC network 8.

The distribution of the streams over the multiple channels of HFC 8 is determined by channel bonding CMTS 66 according to a scheduler, such as, for example, DOCSIS 3.0. It will be appreciated that as time passes, DOCSIS will evolve. Thus, it will be appreciated that DOCSIS 3.0 is described herein for purposes of example only, and other versions of DOCSIS that facilitate channel bonding are included when reference is made herein to DOCSIS 3.0.

Thus, for example, five multiple program transport streams each having a peak bandwidth of 95% of a typical QAM channel may be re-multiplexed into a larger multiple program transport stream. This composite stream may typically need only 85%, for example, of the total available bandwidth of five RF channels that the flow bonding CMTS 66 uses to transport to the composite stream to set top box 67. This is based on the benefit that multiplexing provides resulting from the improbability that a peak bit rate burst will occur for each of the five streams at the same time, as known to those skilled in the art. Thus, what would be five bursty streams becomes a smoother, larger stream with bit rate peaks that are typically less than the total of the bit rate peaks of each of the individual MPEG-2 transport streams.

In addition to more efficiently allocating RF channel bandwidth of HFC 8 to the video streams, the remaining bandwidth available among the five RF channels used in the example can be used for data. Since individual data application flows typically require less bandwidth than a stream that comprises an MPEG-2 stream, flow bonding CMTS 66 can determine how to distribute a given data stream so that all five RF channels are utilized almost to their maximum capacity. CMTS 66 may leave a small fraction of an RF channel's bandwidth unused to provide headroom to accommodate bit rate spikes that the multiplexing and scheduling algorithms may not predict.

As discussed above, the composite multiple program transport streams and data flow are transmitted toward users across HFC 8. At the user end of HFC 8, set top box 67 receives the composite traffic stream and processes same. Set top box 67 separates data from video and provides the data at data port 72. Video information is provided at video port 74 according to a user's program selection, such as, for example, ESPN or HBO.

Figure 7:
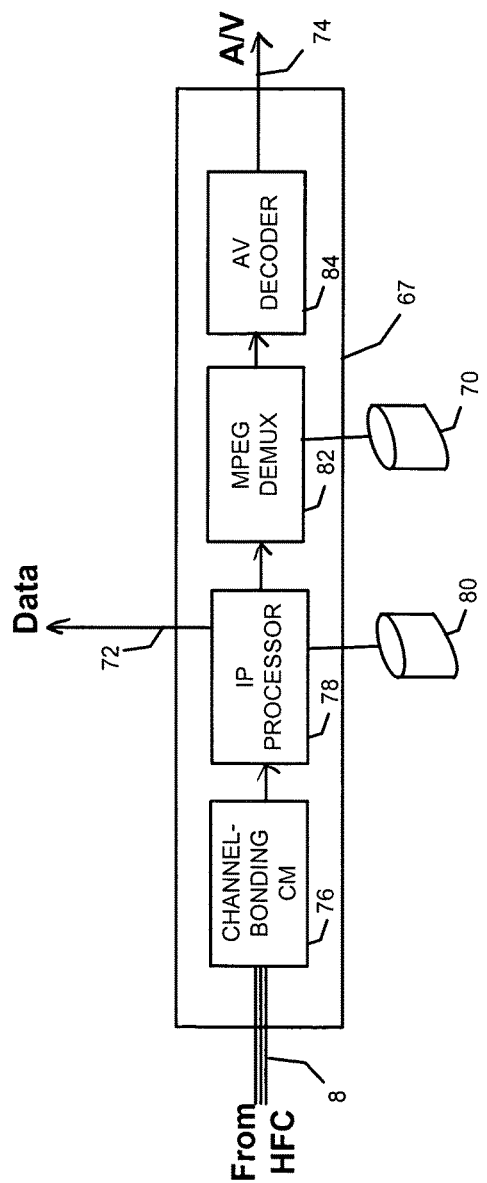
FIG. 7 illustrates a block diagram of a set top box that incorporates a flow-bonded cable modem.

Turning now to FIG. 7, an incoming composite traffic stream is received at set top box 67 by channel bonding cable modem 76. Channel bonding cable modem 76 typically has as many RF tuners, MAC components and other circuitry of a typical cable modem as discussed above in reference to other figures. The tuners are tuned to the particular channel frequencies that the channel bonding CMTS uses to transmit the composite traffic stream. The channel bonding cable modem 76 places the packets from the multiple channels into the correct sequence, and forwards them to IP processor 78. IP Processor 78 determines whether a packet is a data packet or other type of packets based on IP table 80, and outputs data streams at data port 72 of set top box 67, and provides video multiple program transport streams to MPEG demultiplexer 82.

Demultiplexer 82 determines which of the streams belong to a given MPEG-2 program based on table 70, which is received from the CMTS via program packets as discussed above. Thus, a copy of table 70 is present at the head end and at the set top box 67. Demultiplexer 82 uses table 70 to convert a given MPEG-2 transport stream for forwarding to decoder 84 and outputting at port 74 according to which video program a user has selected with the set top box 67. In addition to providing more efficient use of bandwidth of the RF channels, an added benefit of having multiple programs available to demultiplexer 82 simultaneously is that table 70 is larger than typically used in digital video transmission. When a user selects a change of programs, there will typically be a substantial reduction in delay in changing programs because stream information of many programs is available. For example, if a typical RF channel can carry ten programs, and five RF channels are bonded together, fifty (or possibly more due to more efficient use of bandwidth resulting from the benefit of multiplexing) programs may be referenced in table 70. Thus, instead of having to wait for a new table to download when a program is selected that is not referenced in the current table, a program stream may be quickly identified from the current table 70. In addition, faster program change may be realized because the RF tuners of modem component 76 may only have to change 20% as often (where, for example, five channels are bonded together) as a set top box having only one RF tuner and one corresponding MAC. Furthermore, since streams of multiple programs are available at demultiplexer 82 simultaneously, upstream requests for new RF channel tuning information from the CMTS are needed less frequently.

Figure 8:
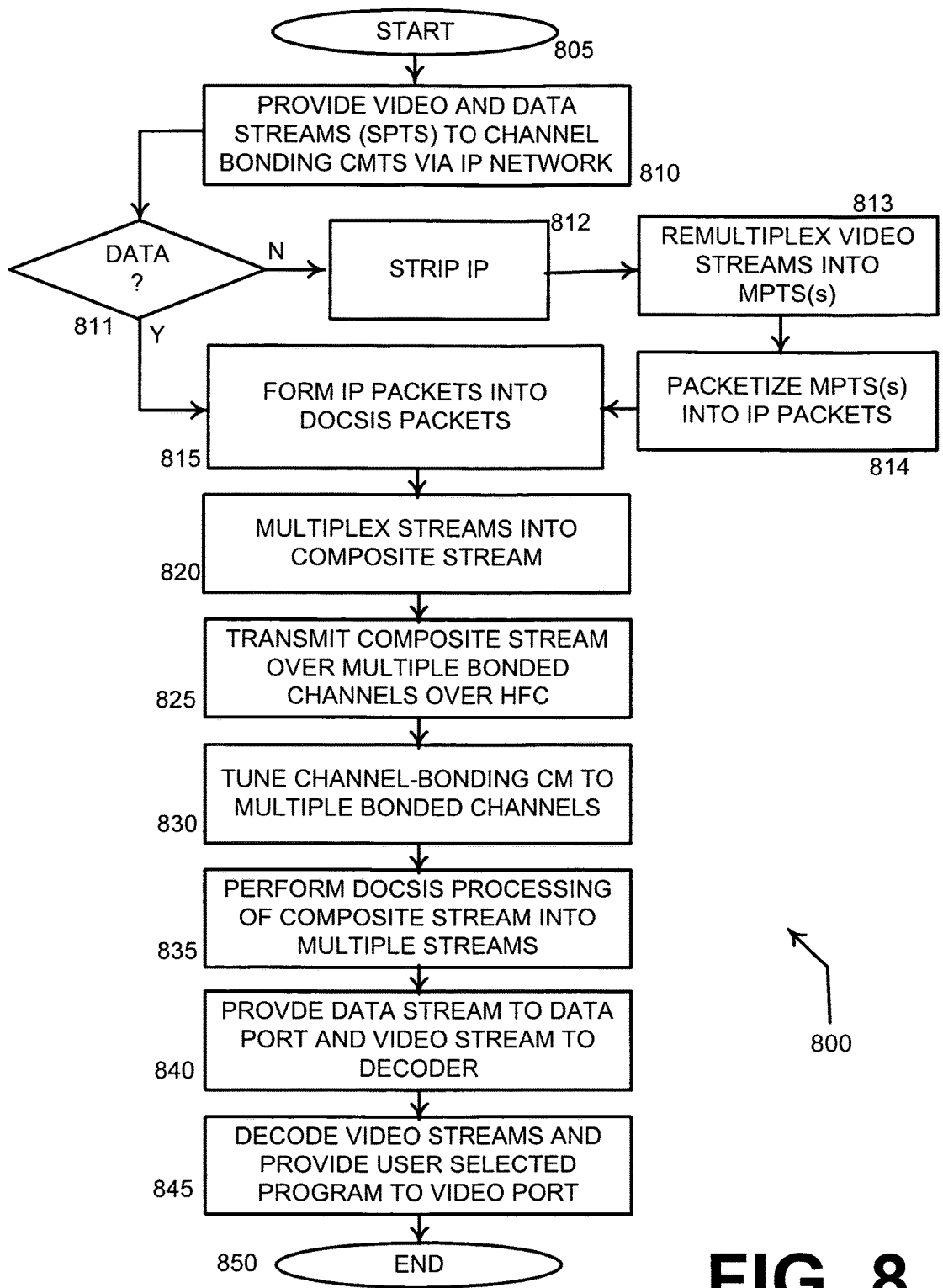
FIG. 8 illustrates a flow diagram for a method of delivering video traffic to a set top box having a flow bonding cable modem.

Turning now to FIG. 8, a flow diagram is illustrated of a method 800 for providing multiple video streams to a user over multiple HFC RF channels. Process 800 begins at step 805 and multiple MPEG-2 video streams, as well as data streams, are made available to a channel bonding CMTS via IP packets over in IP network at step 810. IP data packets of the streams provided to the CMTS at step 810 are separated from video packets at step 811 and processed into DOCSIS packets at step 815. If a packet is determined to be a video program packet at step 811, IP information is stripped from it at step 812 and it is then remultiplexed into a multiple program transport stream or streams at step 813. It will be appreciated that a packet of a given stream may belong to one of a plurality of streams that correspond to a particular program as discussed above. Thus, packets of one of a plurality of related streams may be multiplexed further with packets of other, unrelated streams, which may themselves compose one of a plurality of streams belonging to another program. The remultiplexed packets are transformed into IP packets at step 814. These IP packets are then formatted into transmission protocol (e.g. DOCSIS) packets at step 815. The transmission protocol packets are then multiplexed into a composite stream at step 820. The composite stream packets are transmitted using flow-bonded channels of an HFC network at step 825 toward a user.

A channel bonding cable modem at a user location tunes its multiple RF tuners to the channel frequencies used by the channel bonding CMTS to receive the composite traffic stream at step 830. DOCSIS packets received by the RF tuners are processed into the proper sequence to reform the composite stream, from which the multiple streams that compose the composite traffic stream are generated at step 835. A data stream, or streams, from among these multiple streams are provided to a data port and video streams are provided to a video demultiplexer at step 840. A video decoder combines the individual streams that compose an MPEG-2 transport stream that corresponds to a user-selected program, and outputs these as an audio/video signal at an audio/video port at step 845. The process ends at step 850.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A system for delivering a plurality of digitally encoded video program streams as a composite video traffic stream flow over multiple channels of a distribution communication network that connects equipment at a central location to user equipment at user locations, comprising:

an IP filter that filters IP packets, wherein the IP packets include digitally encoded video program packets and non-video data packets;
means for multiplexing a plurality of digitally encoded video program packets corresponding to a plurality of single program transport streams into a plurality of multiplexed program streams, the means for multiplexing coupled to the IP filter;
means for transmitting the plurality of multiplexed program streams over a plurality of bonded channels as a composite stream; and
one or more variable bit rate encoders for generating the plurality of digitally encoded video program packets, the one or more variable bit rate encoders coupled to the IP filter;
wherein the one or more variable bit rate encoders are MPEG-2 encoders;
the means for multiplexing comprising a channel-bonding CMTS configured to multiplex the IP packets with the digitally encoded video program streams into the composite stream; and the IP filter configured to determine whether each one of the IP packets is one of the nonvideo data packets or one of the digitally encoded video program packets, and if the one of the IP packets is one of the digitally encoded video program packets, to strip IP header information and IP addresses from the one of the IP packets, and if the one of the IP packets is one of the non-video data packets, to forward the one of the IP packets to the means for transmitting without stripping the IP header information or the IP addresses from the one of the IP packets.

2. The system of claim 1 wherein the digitally encoded video program packets and the non-video data packets are provided to the IP filter and the channel-bonding CMTS via a wide area network.

3. The system of claim 2 wherein the wide area network is an IP network.

4. The system of claim 1 wherein the means for multiplexing generates a multiple program transport stream table based on information of a plurality of single program transport streams.

5. The system of claim 1 further comprising data servers that are coupled to the means for transmitting, wherein data may be transmitted in the distribution communication network using bandwidth that is unused by the composite stream.

6. The system of claim 1 wherein the means for multiplexing is configured to form the plurality of multiplexed program streams according to a communication protocol.

7. The system of claim 1 wherein the MPEG-2 encoders are configured to combine the digitally encoded video program packets corresponding to a plurality of single program transport streams into an MPEG-2-compliant multiple program transport stream.

8. A method for delivering a plurality of digitally encoded video program streams as a composite video traffic stream flow over multiple channels of a distribution communication network that connects equipment at a central location to user equipment at user locations, comprising:

operating an IP filter that filters IP packets, wherein the IP packets include digitally encoded video program packets and non-video data packets;
operating a channel-bonding CMTS to multiplex an output of the IP filter comprising a plurality of digitally encoded video program packets corresponding to a plurality of single program transport streams into a plurality of multiplexed program streams;

operating one or more variable bit rate encoders for generating the plurality of digitally encoded video program packets, the one or more variable bit rate encoders coupled to the IP filter;

wherein the one or more variable bit rate encoders are MPEG-2 encoders;

transmitting the plurality of multiplexed program streams over a plurality of bonded channels as a composite stream; and operating the IP filter to determine whether each one of the IP packets is one of the nonvideo data packets or one of the digitally encoded video program packets, and if the one of the IP packets is one of the digitally encoded video program packets, stripping IP header information and IP addresses from the one of the IP packets, and if the one of the IP packets is one of the non-video data packets, transmitting the one of the IP packets without stripping the IP header information or the IP addresses from the one of the IP packets.

9. The method of claim 8 wherein the digitally encoded video program packets and the non-video data packets are provided to the IP filter and the channel-bonding CMTS via a wide area network.

10. The method of claim 9 wherein the wide area network is an IP network.

11. The method of claim 8 wherein a multiple program transport stream table is generated based on information of a plurality of single program transport streams.

12. The method of claim 8 further comprising data servers transmitting data in the distribution communication network using bandwidth that is unused by the composite stream.

13. The method of claim 8 wherein the plurality of multiplexed program streams are formed according to a communication protocol.

14. The method of claim 8 wherein the MPEG-2 encoders combine the digitally encoded video program packets corresponding to a plurality of single program transport streams into an MPEG-2-compliant multiple program transport stream.

* * * * *